(12) United States Patent
Yuan et al.

(10) Patent No.: US 8,028,047 B2
(45) Date of Patent: Sep. 27, 2011

(54) COMMUNICATION DEVICE AND METHOD FOR DETERMINING FUNCTION UNIT OF COMMUNICATION DEVICE TO BE COMPATIBLE WITH A COMPUTER

(75) Inventors: Ye Yuan, Shenzhen (CN); Gui-Ping Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/617,958

(22) Filed: Nov. 13, 2009

(65) Prior Publication Data

US 2011/0035473 A1    Feb. 10, 2011

(30) Foreign Application Priority Data

Aug. 4, 2009   (CN) .......................... 2009 1 0305190

(51) Int. Cl.
*G06F 15/177*  (2006.01)
*G06F 15/173*  (2006.01)

(52) U.S. Cl. ........................................ 709/220; 709/223
(58) Field of Classification Search .................. 709/203, 709/220, 222–223
See application file for complete search history.

(56) References Cited

U.S. PATENT DOCUMENTS

| | | | |
|---|---|---|---|
| 7,370,279 B2 * | 5/2008 | Sugimoto | 715/760 |
| 7,509,442 B2 * | 3/2009 | Wada et al. | 710/20 |
| 7,590,767 B2 * | 9/2009 | Fujita et al. | 710/8 |
| 7,610,331 B1 * | 10/2009 | Genske et al. | 709/202 |
| 7,725,613 B2 * | 5/2010 | Bhardwaj et al. | 710/8 |
| 7,793,004 B2 * | 9/2010 | Lee | 710/2 |

\* cited by examiner

*Primary Examiner* — Hussein A. Elchanti
(74) *Attorney, Agent, or Firm* — Altis Law Group, Inc.

(57) ABSTRACT

A communication device is capable of communicating with a computer, and includes a function unit, a storage unit, a determining module, and a sending module. The storage unit stores a driver of the function unit therein, and the driver is capable of making the function unit compatible with the computer after installed to the computer. The determining module is capable of determining the function unit to be compatible with the computer. The sending module is capable of sending the driver to the computer when the function unit is determined by the determining module.

4 Claims, 4 Drawing Sheets

COMMUNICATION DEVICE AND METHOD FOR DETERMINING FUNCTION UNIT OF COMMUNICATION DEVICE TO BE COMPATIBLE WITH A COMPUTER

BACKGROUND

1. Technical Field

The present disclosure relates to communication devices and methods, and particularly to a communication device and a method for a function unit of the communication device to be compatible with a computer.

2. Description of Related Art

A plurality of function devices such as a microphone, a camera, is often not provided in a computer on the market. If consumers want to add the function devices, they may at added cost to a computer. Also, a mobile telephone is often integrated with function units, such as a microphone, a camera, which are capable of performing same functions as the function devices of a computer.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
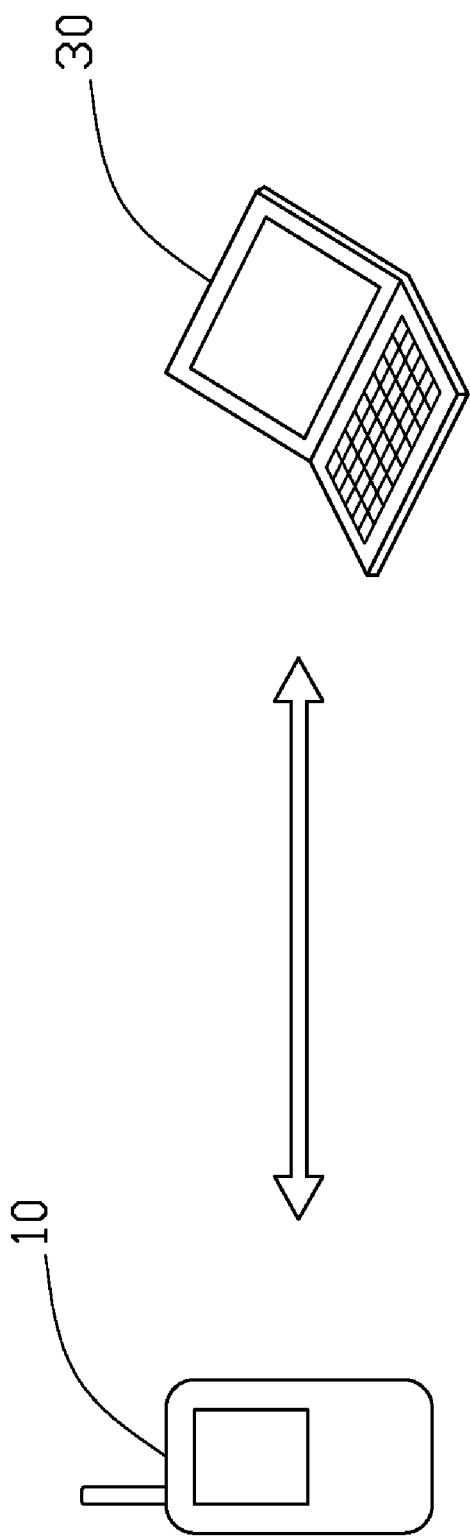
FIG. 1 is a block diagram of a communication device communicating with a computer via a cable, in accordance with an embodiment.

FIG. 1 illustrates a communication device 10 coupled to a computer 30, for example, via a cable or Bluetooth. The communication device 10 is communicable with other communication devices 10 by radio communication technologies. In one embodiment, the communication device 10 may be a mobile telephone, a smart telephone, a personal digital assistant, etc., for example. The computer 30 may be a notebook computer, a desktop computer, etc., for example.

Figure 2:
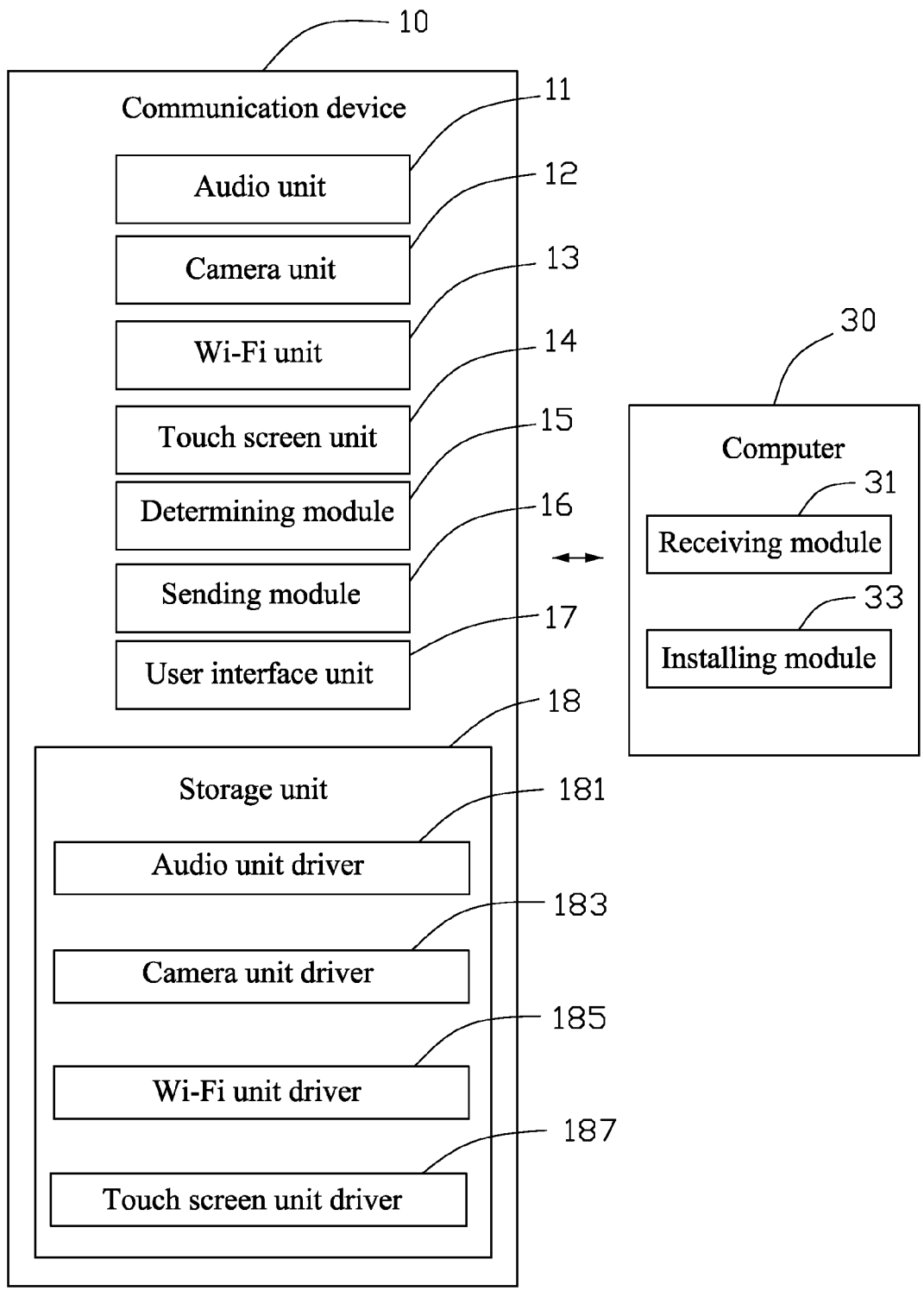
FIG. 2 is a block diagram of the communication device and the computer of the embodiment of FIG. 1.

Referring to FIG. 2, the communication device 10 includes function units, such as, an audio unit 11, a camera unit 12, a Wireless Fidelity (Wi-Fi) unit 13, a touch screen unit 14, a determining module 15, a user interface unit 17, and a storage unit 18, etc. The audio unit 11 is capable of transferring audio signals. The camera unit 12 is capable of transferring video signals. The Wi-Fi unit 12 is capable of transferring wireless signals between the communication device 10 and other devices via the Wi-Fi unit 12. The touch screen unit 14 is capable of receiving user inputs via touch screen. In one embodiment, identifiers representing the audio unit 11, the camera unit 12, the Wi-Fi unit 13, and the touch screen unit 14 can be displayed in the user interface unit 17. The determining module 15 is capable of detecting one of the audio unit 11, the camera unit 12, the Wi-Fi unit 13, and the touch screen unit 14 to be compatible with the computer 30 according to a selected identifier on the user interface unit 17.

The storage unit 18 stores an audio driver 181 for the audio unit 11, a camera driver 183 for the camera unit 12, a Wi-Fi driver 185 for the Wi-Fi unit 13, and a touch screen driver 187 for the touch screen unit 14. In one embodiment, the audio driver 181, the camera driver 183, the Wi-Fi driver 185 and the touch screen driver 187 are installable in the computer 30, so that the audio unit 11, the camera unit 12, the Wi-Fi unit 13, the touch screen unit 14 are compatible with the computer 30.

The communication device 10 further includes a sending module 16. The sending module 16 is capable of sending the driver (e.g. audio driver 181, the camera driver 183, the Wi-Fi driver 185 and the touch screen driver 187) to the computer 30.

The computer includes a receiving module 31 and an installation module 33. The receiving module 31 is capable of receiving the driver (e.g. the audio driver 181, the camera driver 183, the Wi-Fi driver 185 and the touch screen driver 187). The installing module 33 is capable of installing the received driver in the computer 30.

Figure 3:
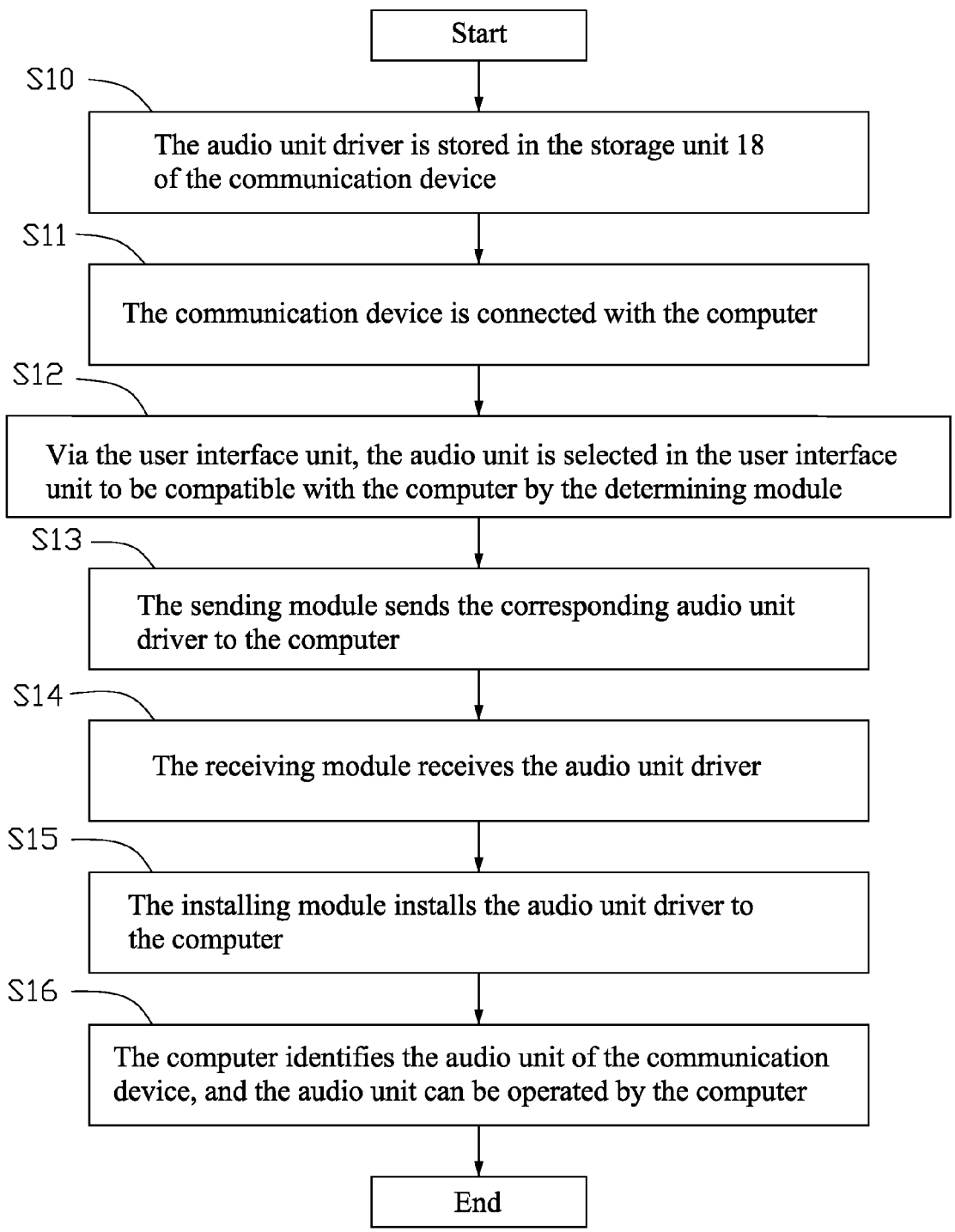
FIG. 3 is a flow chart of an embodiment of a method for an audio unit of the communication device to be compatible with the computer.

FIG. 3, illustrates a flow chart of an embodiment for a method for having the audio unit 11 compatible with the computer 30. Through the method, the audio unit 11 can be operated by the computer 30.

In block S10, the audio unit driver 181 is stored in the storage unit 18 of the communication device 10.

In block S11, the communication device 10 is connected with the computer.

In block S12, via the user interface unit 17, the audio unit 11 is selected in the user interface unit 17 to be compatible with the computer 30 by the determining module 15.

In block S13, the sending module 16 sends the corresponding audio unit driver 181 to the computer 30.

In block S14, the receiving module 31 receives the audio unit driver 181.

In block S15, the installing module 33 installs the audio unit driver 181 to the computer 30.

In block S16, the computer 30 identifies the audio unit 11 of the communication device 10, and the audio unit 11 can be operated by the computer 30.

Figure 4:
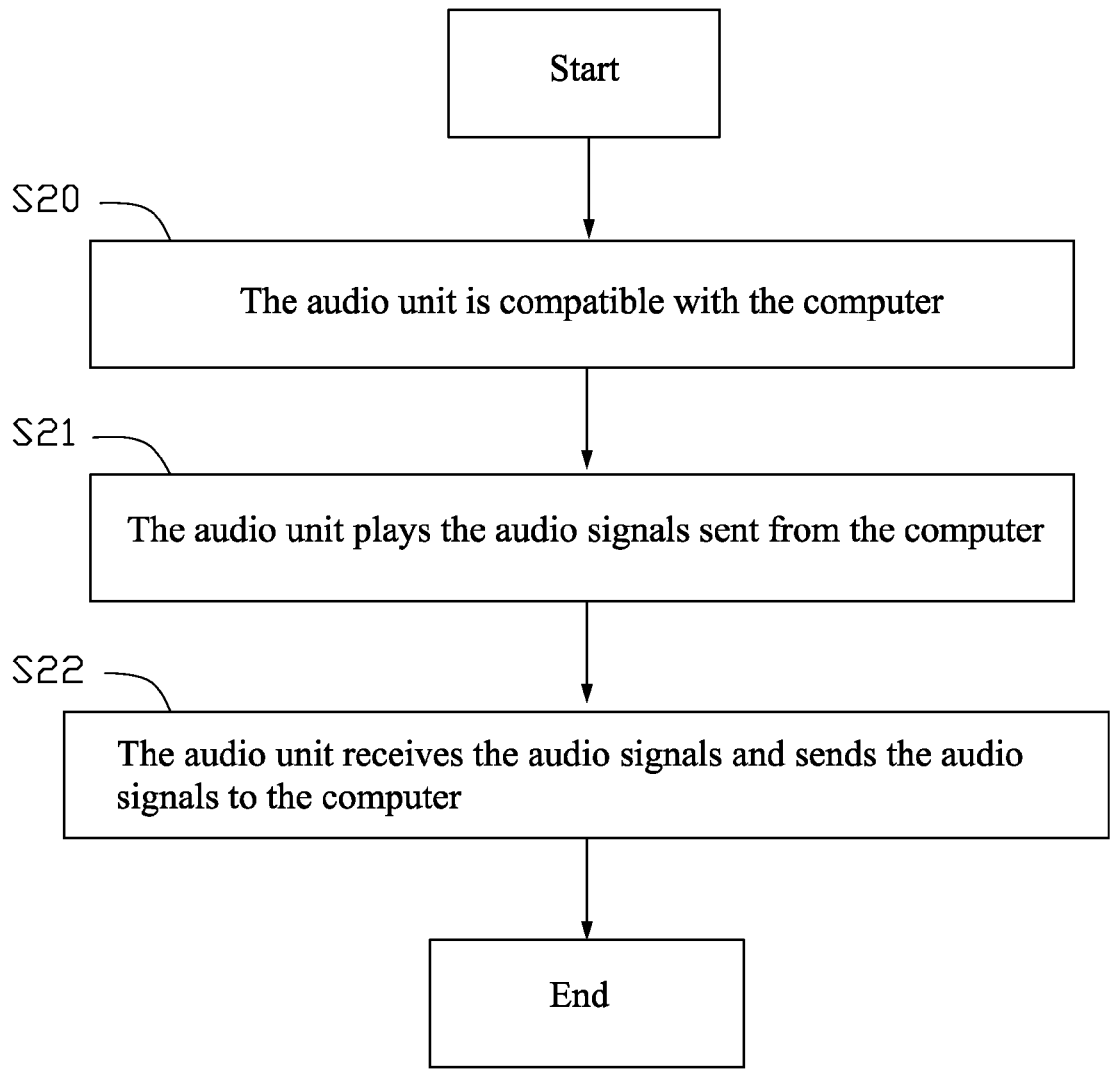
FIG. 4 is a flow chart of an embodiment of a process for using an audio unit by the computer.

FIG. 4 illustrates a flow chart of an embodiment of a process for using the audio unit 11 (as an example) of the communication device 10 by the computer 30.

In block S20, the audio unit 11 is compatible with the computer 30.

In block S21, the audio unit 11 plays audio signals transferred from the computer 30.

In block S22, the audio unit 11 receives audio signals and sends the audio signals to the computer 30.

In one embodiment, through same method for the audio unit 11 to be compatible with the computer 30 as described above, the camera unit 12, the Wi-Fi unit 13 or the touch screen unit 14 can be compatible with the computer 30. Therefore, the camera unit 12, the Wi-Fi unit 13 or the touch screen unit 14 can be operated by the computer 30.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A communication device capable of communicating with a computer, the communication device comprising:
    a function unit;
    a storage unit storing a driver of the function unit therein, the driver being capable of making the function unit being compatible with the computer after being installed to the computer;
    a determining module capable of determining the function unit to be compatible with the computer;
    a user interface unit, wherein the function unit is selected via the user interface unit for the determining module to determine if the function unit is compatible with the computer; and
    a sending module capable of sending the driver to the computer after the function unit is selected;
    wherein the user interface unit is capable of displaying a name of the function unit.

2. The communication device of claim 1, wherein the determining module is capable of determining the function unit compatible with the computer via the name of the function unit.

3. A method for having a function unit of a communication device compatible with a computer, the method comprising:
    providing the function unit of the communication device;
    storing a function unit driver in the communication device which is capable of communicating with the computer;
    selecting the function unit via a user interface unit and determining the function unit to be compatible with the computer by a determining module of the communication device;
    sending the function unit driver to the computer by a sending module of the communication device, wherein the function unit driver is capable of being installed in the computer; and
    displaying a name of the function unit by the user interface unit.

4. The method of claim 3, further comprising selecting the name of the function unit in the user interface unit before determining the function compatible with the computer.

* * * * *